United States Patent [19]
Alderman

[11] 4,443,665
[45] Apr. 17, 1984

[54] PRIVACY AND HOLD CIRCUIT FOR TELEPHONE

[76] Inventor: Robert J. Alderman, 3406 G-7 Ranch Rd., Ruskin, Fla. 33570

[21] Appl. No.: 430,946

[22] Filed: Sep. 30, 1982

[51] Int. Cl.³ .............................................. H04M 1/70
[52] U.S. Cl. .............................. 179/99 H; 179/81 R; 179/99 E; 179/17 B
[58] Field of Search ................... 179/17 B, 30, 38, 39, 179/81 R, 99 E, 99 H

[56] References Cited

U.S. PATENT DOCUMENTS

| | | | |
|---|---|---|---|
| 3,499,121 | 3/1970 | McIntosh et al. | 179/17 B |
| 3,514,544 | 5/1970 | Chambers | 179/17 |
| 3,725,601 | 4/1973 | Jetzt et al. | 179/99 |
| 3,742,151 | 6/1973 | Ruether | 179/99 |
| 3,870,831 | 3/1975 | McCarley | 179/99 |
| 4,000,376 | 12/1976 | Springer | 179/17 B |
| 4,011,413 | 3/1977 | Phillips | 179/99 H X |
| 4,039,759 | 8/1977 | Taylor | 179/38 |
| 4,053,720 | 10/1977 | Wycheck et al. | 179/17 B X |
| 4,075,434 | 2/1978 | Merritt | 179/99 |
| 4,093,829 | 6/1978 | Silberman | 179/81 R |
| 4,169,216 | 9/1979 | Overdulve et al. | 179/99 H X |
| 4,258,232 | 3/1981 | Smith et al. | 179/99 |
| 4,332,983 | 6/1982 | Vakili | 179/38 X |

OTHER PUBLICATIONS

Howell, Keith E., "Light-Activated Switch Expands Uses of Silicon-Controlled Rectifiers", *Electronics*, May 4, 1964, pp. 53–61.
"General Electric SCR Manual", Copyrt. 1977; pp. 73-78 enclosed.
"Telephone Accessories You Can Build", Jules H. Gilder, (Hayden, 1976), pp. 77–79, Article #17, Hold Button.
"More Telephone Accessories You Can Build", Jules H. Gilder, (Hayden, 1980), pp. 3–5, Music on Hold; pp. 106–107, Priority Telephone.

*Primary Examiner*—A. D. Pellinen
*Assistant Examiner*—Keith E. George
*Attorney, Agent, or Firm*—Jones & Askew

[57] ABSTRACT

A simplified combination of privacy circuit (U1) and holding circuit (U2) for use on a telephone subscriber loop (11). The circuit arrangement includes a diode array (31–34) within a conventional full wave rectifier bridge (21–24) having a pair of interchangeable terminals (28, 29) and a third differentiated terminal (39) for connection in the loop. The interchangeable terminals are connected in series with either the tip or ring conductor with the remaining terminal connected to the other conductor. The combination of diode array and bridge assures that, irrespective of the connection arrangement, the hold circuit always shunts the series combination of telephone and privacy circuit. A novel self limiting amplifier stage including a plurality of diodes (76) shunting the collector to emitter output of a transistor (90) is disclosed for injecting a music-on-hold signal when the hold circuit is active. Additionally, a capacitance (170) in the gate to cathode circuit of a thyristor (46b) in the hold circuit can be charged to a voltage exceeding the on state gate to cathode voltage. A path for discharging the capacitance (182) is provided when the thyristor momentarily shuts off during a momentary loop current interruption to retrigger the SCR solely through the gate to cathode circuit without the use of switching circuits connected to the anode side of the SCR.

5 Claims, 8 Drawing Figures

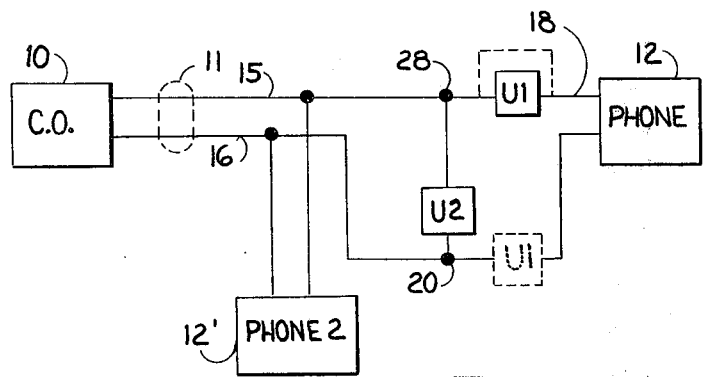
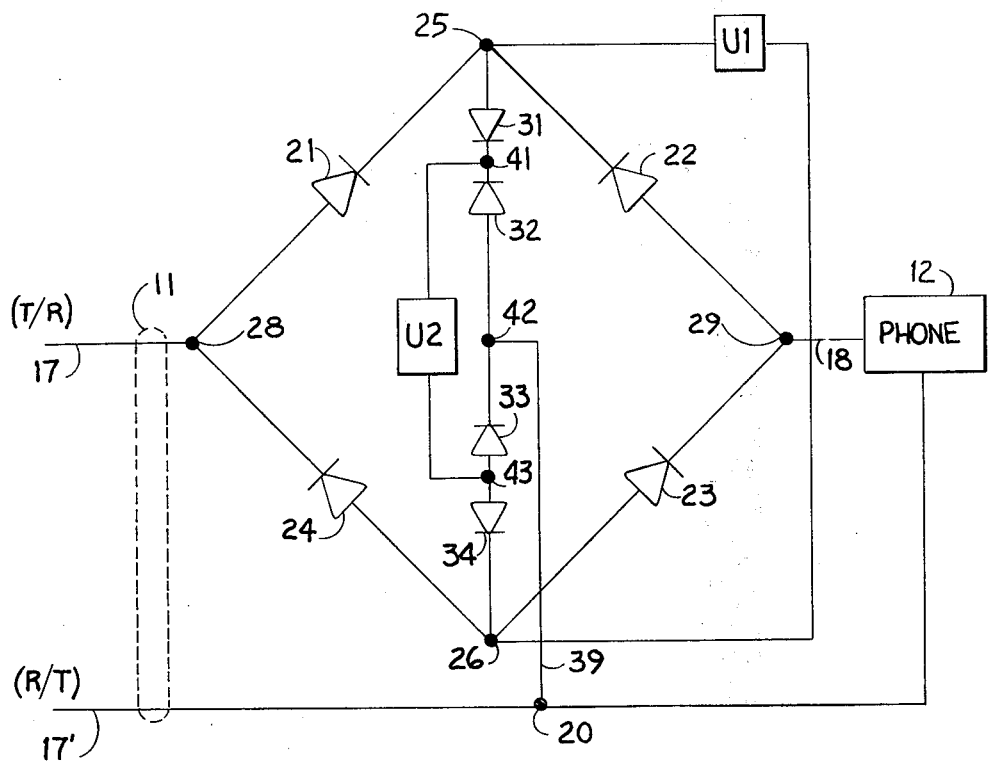

PRIVACY AND HOLD CIRCUIT FOR TELEPHONE

TECHNICAL FIELD

The present invention relates to privacy and line holding devices in the art of telephony and more particularly discloses a simplified improved circuit combining both a privacy and a hold circuit including a "music on hold" arrangement, all of which is connected by a simple three terminal arrangement.

BACKGROUND OF THE INVENTION

There are many circuit arrangements known in the art of telephony for providing a holding condition on a telephone line. Also, various prior art arrangements have been constructed for providing call privacy on single line multiextension connections. Arrangements of this type are designed to prevent another extension on the same line from becoming effectively connected to the line when someone on another extension has previously seized the phone line and has a call in progress.

In the past (and to the present day), relay circuits have been used for constructing hold circuits. Universally, hold circuits for single line telephones shunt the telephone set when the hold condition is to be established so as draw sufficient loop current through the line to cause the central office to respond as if the telephone set is still off-hook. More recently, arrangements have been constructed using semiconductor devices with voltage sensitive arrangements for establishing, maintaining, and terminating a hold condition.

More recently, "music on hold" arrangements have become popular wherein a signal, which is usually music, is injected into the line when it is placed on hold in an attempt to alleviate the boredom usually associated with waiting for a call on hold to recommence.

Since the promulgation of Part 68 of the Regulations of the Federal Communications Commission in the United States, many add-on devices to be retrofit to telephone subscriber lines have been constructed and sold. The regulations of Part 68 are designed to protect the equipment of the telephone network to which such devices are connected. Among the technical requirements of these regulations are minimum shunt impedances for devices and limits on the signal level which may be applied to the telephone line by external devices such as music on hold circuits.

Also, for devices sold directly to consumers, it is highly desirable to minimize the familiarity which the user must have with the technical aspects of telephony for proper installation. Since most privacy circuits and hold circuits using semiconductor devices are polarity sensitive, it has been common to use full wave bridge rectifier circuits as polarity guards to obviate the necessity of being able to distinguish between the tip and ring conductors. However, before the present invention, a plurality of bridge circuits to act as a polarity guard would be required to allow a user to retrofit a device, including a utilization circuit, in series with a telephone loop such as privacy circuit, and a utilization device shunting the loop such as a hold circuit. While such bridge arrangements are relatively straightforward, and could be combined in a package wherein only three terminals were brought out externally to the user, construction of such an arrangement would require the user to pay careful attention to which terminal was connected closest to the telephone and which terminal was connected to the central office.

The use of two utilization circuits in an add-on telephone circuit, one shunting the line and one in series with the line, requires that they be designed for placement at a known position in the telephone line relative to each other and the central office. If the person installing an arrangement reverses the locations, the circuit will not respond properly and normally will not operate. Consider the example of a first utilization circuit designed to be connected in series with the telephone set and a second utilization circuit shunting the subscriber loop. This is the type of arrangement used in the present invention. As described, the second utilization circuit is specifically designed to shunt the subscriber loop on the central office side of the series combination of telephone and first utilization circuit. If the arrangement is reversed, even though the polarity will be correct, the first utilization circuit will then be placed in series with the parallel combination of telephone and second utilization circuit. Thus, it is desirable to create a three terminal arrangement which may be placed in series with one of the loop conductors between a particular terminal pair, with the other terminal connected to the other conductor, which will unambiguously provide the proper polarity, and assure that the shunting utilization circuit does not have the series utilization circuit between it and the central office.

It is also known in the art that the addition of capacitance in the gate to cathode circuit of an SCR retards the speed at which commutation will occur. In other words, the rapid reapplication of voltage between the main terminals after the device has initially cut off can lead to retriggering under these circumstances. The holding circuits shown in U.S. Pat. No. 4,258,232 includes a parallel combination of a zener diode and a capacitor connected to the base of a transistor switch, which in turn connects the anode circuit of an SCR to the gate circuit for a predetermined period of time after the SCR cuts off. Such an arrangement is designed to retrigger the SCR upon reestablishment of loop current after a momentary interruption. Said patent teaches that it is impractical to capacitively store sufficient charge in a capacitor connected directly to the gate terminal of an SCR and a telephone hold circuit, and thus have included the additional devices of capacitor and transistor switch.

SUMMARY OF THE PRESENT INVENTION

The present invention comprises a simple arrangement for providing both a privacy circuit arrangement and a hold circuit with a line powered music-on-hold arrangement. The present invention includes a novel very simple coupling amplifier which limits the signal level which may be placed on the line from an audio signal source. Also, the present invention includes a novel polarity guard and utilization circuit location arrangement which allows the user to install two terminals in series with one of the loop conductors, irrespective of which terminal is connected closest to the telephone, and a third terminal to the other loop conductor. In its simplest form, the identity of the tip and ring conductors must be determined. In its most preferred form, the present invention provides a three terminal arrangement wherein one terminal pair may be placed in series with either tip or ring conductor with the third terminal being connected to the remaining conductor. The present invention will unambiguously apply the proper polarity to the utilization circuits and assure that the shunting utilization circuit shunts the series combination of series utilization circuit and telephone.

In its simplest form, the limiting amplifier of the present invention is a transistor amplifier having one or more diodes connected between collector and emitter. The parallel combination of the collector to emitter circuit of the transistor and the diodes is placed across the loop when the hold circuit is in active condition.

Thus, it is an object of the present invention to provide a simple and inexpensive add-on device for a single line extension telephone which has a reliable privacy circuit and a simple hold circuit which also includes a music-on-hold arrangement powered from the telephone line without drawing undue amounts of current therefrom.

It is further an object of the present invention to provide an improved arrangement for retriggering a thyristor device in a telephone hold circuit which employs a capacitor connected in a gate to cathode loop circuit which stores sufficient charge to retrigger the SCR after momentary interruptions loop current without using an unduly large capacitor. Thus, it is an object of the present invention to accomplish what previous disclosures has indicated was impractical.

These and other objects of the present invention will be apparent from the detailed description to follow.

BRIEF DESCRIPTION OF THE DRAWINGS

FIG. 1 is a block diagram of the connection of the utilization circuits of the present invention in its intended environment.

FIG. 2 is a schematic diagram of the preferred embodiment of the connection arrangement of the present invention showing the utilization circuits as blocks.

DETAILED DESCRIPTION

Figure 3:
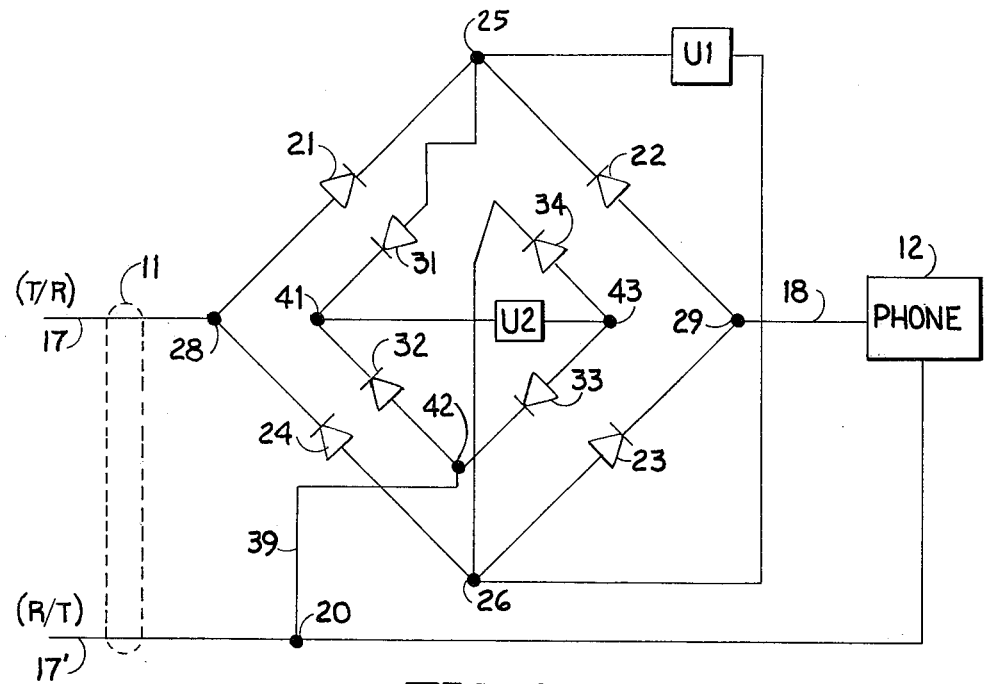
FIG. 3 is an alternate representation of the same circuit shown in FIG. 2.

Turning now to the drawing figures, in which like numerals represent like elements, the preferred embodiments of the present invention will now be described.

Turning first to FIG. 1, it may be seen that the present invention is used in an environment where a telephone office 10 is connected by a subscriber line 11 to one or more telephones 12. Subscriber line 11 consists of tip conductor 15 and ring conductor 16.

The utilization devices which form a part of the present invention are series utilization device U1 and shunt utilization device U2. Device U1 is in series with phone 12 between point 28 and line 18. Shunt utilization device U2 shunts the series combination of U1 and phone 12 between points 20 and 28. As will become apparent from the following description, the preferred form of utilization of devices U1 and U2 are, respectively, circuitry for implementing a privacy feature and circuitry for effecting a music-on-hold function.

Turning next to FIG. 2, a schematic diagram of the preferred form of the diode connection arrangement of the present invention is shown with utilization circuits U1 and U2 being retained in block diagram form. As shown on FIG. 2, subscriber line 11 comprises a pair of conductors designated as 17 and 17'. The notation (T/R) and (R/I) is used to indicate that either of lines 17 or 17' may be either the tip or ring conductor.

Thus it will be apparent that line 18 which extends between point 29 and phone 12 may represent either the tip or ring conductor coming from telephone 12.

The diode connection arrangement of the preferred embodiment consists of a rectifier comprising diodes 21-24 connected in well known configuration of a full wave bridge. As may be seen from inspection of FIG. 2, this substituent part of the invention, in and of itself, is used as a polarity guarding circuit in a conventional manner. Either of points 28 or 29 on the bridge may be connected to either the positive or negative side of the circuit to which the input port of the bridge is connected and the polarity will unambiguously be positive to negative between points 25 and 26 on the bridge.

The combination of this full wave rectifier bridge, together with the diode array consisting of diodes 31-34 as shown in FIG. 2, constitutes the preferred embodiment of the diode connection arrangement in the present invention. It should be noted that points 25 and 26 comprise a two terminal output port of the full wave rectified bridge with point 25 being the positive output terminal and point 26 being the negative output terminal.

It may be seen also from the symmetry of the bridge circuit, that points 28 and 29 may be interchanged. Thus, as used in this specification, the distinction between points 28 and 29 is which of the two points is connected to the telephone side of the tip or ring conductor, which is broken to insert the preferred embodiment, and which is connected to the central office side of the conductor. Physically they may be interchanged.

The diode array consisting of diodes 31-34 is connected as shown in the drawings to form three junction points 41, 42 and 43. Utilization device U2 is connected between junction points 41 and 43. In some embodiments of the present invention, such as the preferred embodiment, U2 requires a particular polarity of connection. Thus point 41 is connected to the positive input terminal of U2 and point 43 is connected to the negative input terminal of the utilization device.

As set forth in the background of the invention, to properly operate, circuits of the type similar to the preferred embodiments of utilization circuits U1 and U2 must be connected to the telephone line in the manner shown in FIG. 1 in which utilization circuit U2 shunts the series combination of utilization circuit U1 and telephone 12. It will be appreciated from inspection of the circuitry of FIG. 2, and the following description, that the diode connection arrangement of the present invention may be connected in a manner which requires virtually no familiarity with electronics by the end user of the preferred embodiment.

In constructing the preferred embodiment, the electrical connections to lines 17 and 18 are preferably identified by connecting leads having the same color of insulation thereon to indicate to the user that they are interchangeable. Thus, as noted above, it is inconsequential which of the two input terminals of the input port of the full wave bridge becomes connected to the central office and which becomes connected to phone set 12. The wire corresponding to line 39 is identified by insulation of a color distinct from that used for lines 17 and 18. While the user should be alerted that some telephone connections use a separate conductor (usually identified by yellow insulation) connected to the ringer, they should be able to identify the tip ring pair on a conventional subscriber line by the color. This will be true even if the installer has (as is not uncommon) reversed the intended polarity between tip and ring.

Thus, instructions to the user need only include the following information:
  (a) One of the two conductors between a wall terminal block and the telephone set should be cut. The two wires identified by the same color insulation, corresponding to lines 17 and 18 of FIG. 2, should be connected to the two cut ends of the severed conductor; and
  (b) The remaining wire from the preferred embodiment, corresponding to line 39 in FIG. 2, should be connected to the uncut conductor between the wall terminal block and the telephone.

It will be appreciated from inspection of FIG. 2 and the following description that execution of these instructions will unambiguously lead to the proper connection as shown in FIG. 1. It should be noted that utilization circuit U1 can, instead of where shown normally in FIG. 1 be located in the position where shown in phantom in FIG. 1. However, the important relationship is maintained: that of having utilization circuit U2 shunt the series combination of U1 and the telephone.

It should be appreciated from inspection of FIG. 2 that the full wave rectified bridge (diodes 21-24) with utilization circuit U1 connected as shown between positive output terminal 25 and negative output terminal 26 will effect the conventional known function of such a bridge in the art of telephony by assuring that utilization circuit U1 is effectively in series with line 17, telephone 12, and line 17'.

Consider as a first example a situation in which conductor 17 is the tip conductor and conductor 17' is the ring conductor. In this example, current will flow into lead 17 through diode 21 but will not flow through diode 22. Current will proceed from point 25 through utilization device U1 to point 26. From thence it will be blocked by reverse biased diode 24 and will thus proceed through diode 23 to point 29, through line 18 to phone 12. From there it returns to the central office through line 17' which, in the example, is the ring conductor. Next consider the effect of utilization circuit U2 and diode array of diodes 31-34. Part of the current flowing through diode 21 to point 25 will flow through forward biased to diode 31. The current in this branch will be blocked from flowing between points 41 and 42 by reverse bias diode 32.

Thus the current from point 41 will flow through utilization device U2 onto point 43. Next consider what is electrically "seen" from point 43. Diode 33 will be forward biased and allow current to flow from point 43 to point 42 and thus onto point 20. So long as telephone 12 is off-hook, utilization device U1 will not drop the entire voltage appearing across subscriber line 11. Thus, with the exception of the drops across diodes 21, 31 and 33, the entire voltage appearing across subscriber line 11 will be impressed across utilization device U2.

Since point 26 is at a voltage which may be determined (ignoring the drop across diode 23) by the division ratio between the impedance of device U1 and the impedance of phone 12, under practical conditions point 26 will be at a higher voltage than point 43 (which is one forward PN junction drop higher than point 20) and thus diode 34 will be reversed biased. Therefore the current flowing through utilization device U2 will proceed through diode 33 to point 42, through conductor 39 and on to point 20. From thence it is returned through lead 17' which is the ring conductor in the example.

Note further that if diodes 21-24 and 31-34 are replaced by their ideal equivalents (open circuit for reverse bias, and short circuit for forward bias) the equivalent circuit arrangement is that shown in FIG. 1 with U2 shunting the series combination of U1 and telephone 12.

Next consider the case where the identities of lead 17 and 17' are reversed and thus lead 17 is the ring conductor of subscriber line 11 and lead 17' is the tip conductor. First consider the current coming from tip conductor 17' through phone 12 and line 18 to point 29. From this point it is blocked by diode 23 and passed by diode 22 in a conventional manner. Again, point 25 is the positive output terminal of the full wave rectifier and the current will proceed through utilization device U1 to point 26, on through diode 24 to line 17 which is the ring conductor in the example. Thus, in this example, utilization device U1 remains in series with telephone 12 but line 18 in this example represent the conductor from phone 12 normally connected to the ring lead of subscriber line 11.

Next consider utilization device U2 and diode array 31-34. In the example, point 20 is connected to the tip conductor and point 26 is connected through one forward biased diode 24 to the ring lead. Thus, diode 33 is reverse biased.

Also consider that point 25 is at a voltage determined by the division ratio of the impedance of circuit U1 and the impedance of telephone 12. Thus, point 42 is positive with respect to point 25. It will thus be apparent from inspection of the circuit that diode 32 will be forward biased and diode 31 will be reverse biased. Thus the current entering point 42 from line 39 will flow through diode 32 and through utilization device U2 to point 43. Under the practical assumption that the voltage drop across utilization circuit U2 is greater than a forward PN junction drop, diode 33 will be reverse biased and diode 34 will be forward biased. Thus the current from point 43 will flow through forward biased diode 34 to point 26, on through diode 24 and back to point 28 where it is connected to line 17, the ring conductor in the example.

Note that in both examples the voltage impressed across U2 is of the same polarity. Also, again replacing the diodes by their ideal equivalents, it will be seen that utilization device U2 shunts the series combination of phone 12 and device U1. Considering the second example, the equivalent arrangement will be that shown by the phantom representations in FIG. 1.

Thus it will be seen that the diode connection arrangement of the present invention provides a three terminal circuit wherein two of the terminals may be inserted into either one of the conductors of subscriber line 11 without regard to whether it is the tip and ring conductor into which they are inserted, and without regard to which of leads 17 or 18 is connected to phone 12 and which is connected to central office 10. The remaining terminal of the described three terminal device is point 20 which is merely connected electrically to the other conductor of the subscriber line. Under these circumstances, as may be seen from the previous example, utilization device U1 will be connected in series with phone 12 always with the positive terminal 25 more positive than negative terminal 26. Furthermore, the polarity across utilization device U2 will always be point 41 positive with respect to point 43 and U2 will always shunt the series combination of U1 and phone 12.

Turning next to FIG. 3, an electrically identical, but geometrically different, arrangement of the circuit of FIG. 2 is shown. The redrawing of FIG. 3 has been made simply to present a conceptual approximation of the circuit of FIG. 2. By redrawing diode array 31–34 as shown in FIG. 2, it may be seen that the entire diode connection arrangement may be thought of as approximating a "bridge within a bridge". However, it should be noted that the circuit is not the equivalent of two conventional full wave rectifier bridges used separately as polarity guards. As was described in the background of the invention, supra, simply using two separate full wave rectifier bridges as polarity guards would cause the user to have to distinguish which of the input conductors of the bridge determining the polarity across circuit U1 was connected closest to the central office and which was connected to the telephone. Since the second "bridge" consisting of diodes 31–34 has been disconnected at what normally would be an input terminal, it will be appreciated that the novel arrangement shown in FIGS. 2 and 3 is not the equivalent of the use of two standard bridges as polarity guards. Indeed, as is demonstrated by the positive elements and the phantom elements of FIG. 1, the diode connection arrangement of the present invention provide a three terminal circuit in which two of the terminals comprise an interchangeable pair which will may be inserted into one lead of a subscriber line with the third terminal being connected to the other lead of the subscriber line which unambiguously places utilization circuits U2 in parallel with a series combination of phone 12 and utilization circuit U1.

Figure 4:
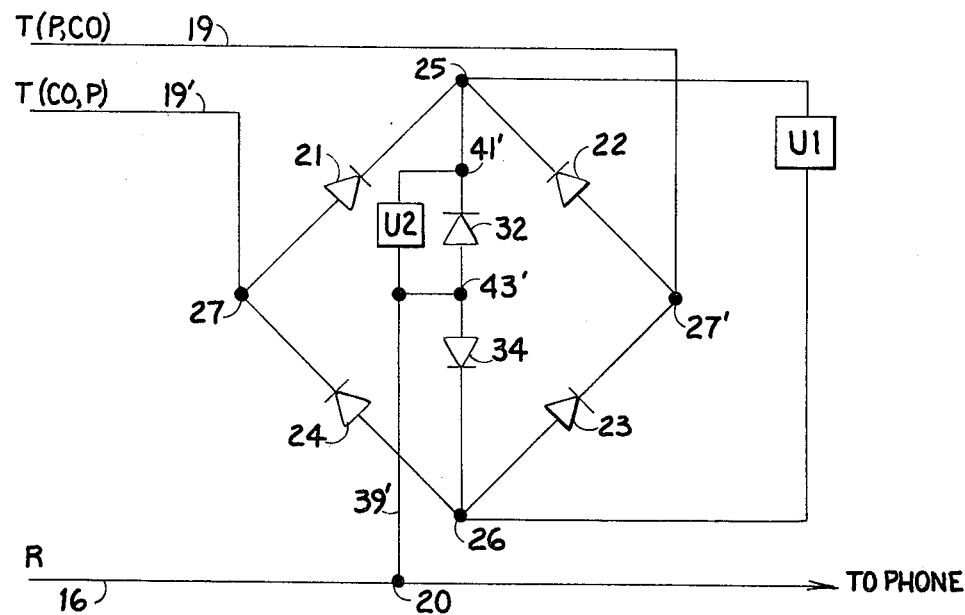
FIG. 4 is a schematic diagram of an alternate embodiment of the connection arrangement of the present invention showing the utilization circuits as blocks.

Turning next to FIG. 4, an alternate embodiment of a simplified form of the present invention is shown. Inspection of FIG. 4 as compared to FIG. 2 will show that the diode connection arrangement is identical except for the omission of diodes 31 and 33 from the diode array. While this arrangement is not the most preferred form of the present invention, it is an alternative form that is considered within the scope of the present invention. In using such an embodiment of the present invention, points 27 and 27' on the main bridge (diodes 21–24) are also interchangeable, with lead 39' requiring identification separate from the leads connected to points 27 and 27'. However, the embodiment of FIG. 4 requires that the two interchangeable leads, which are shown as 19 and 19', be inserted in series with a particular one of the conductors comprising subscriber line 11. In the example shown, retaining diodes 32 and 34 of the diode array, leads 19 and 19' must be inserted into the tip conductor.

The notation T(P,CO) and T(CO,P) used in connection with leads 19 and 19', respectively, indicates that both must be connected in series with the tip lead but that either one may be connected to the central office with the other connected to phone set 12. Thus, while the user of the embodiment of FIG. 4 does not have a choice of which of the subscriber line leads to cut, the arrangement can be connected irrespective of which of leads 19 and 19' is connected to the central office. Thus, the lead embodying line 39' must be identified in a manner which distinguishes it from interchangeable leads 19 and 19', and must be connected to the ring conductor. In this arrangement, the polarity between lines 19 and 19' may be reversed depending on which is connected to the central office and which is connected to the phone. However, inspection of FIG. 4 will indicate that under either condition, point 25 is again positive with respect to point 26 and utilization device U1 is in series with conductors 19 and 19'. Thus, utilization device U1 will be in series with the tip conductor and the telephone (not shown in FIG. 4). Since point 25 will also be only one forward PN junction drop lower than the lead of the pair 19 and 19' is connected to the central office, current will flow from point 25 to point 41'. Diode 32 will be reverse biased by the voltage drop across utilization device U2 and thus current from point 41' will flow through device U2 and line 39' back to the ring conductor at point 20. Since the voltage of point 26 is determined by the division ratio between the impedance of device U1 and the telephone to which the arrangement is connected, diode 34 will be reverse biased.

Again considering the arrangement of the diode shown in FIG. 4 as replaced by their ideal equivalents, it will be apparent that U2 will always shunt the series combination of U1 and the telephone irrespective of whether lead 19 or 19' is connected to the central office tip conductor.

Furthermore, from the foregoing it will be apparent that an equivalent structure using only diodes 31 and 33 in the diode array, and defining points 27 and 27' as being connected to the ring conductor, with line 39 connected to the tip conductor, may be constructed in an apparent manner. Thus, the diode connection arrangement on the present invention provides an inexpensive and very simple device for connecting a first utilization circuit in series with a telephone in either conductor of the subscriber line and always connecting a second utilization device shunting the foregoing series combination. Proper polarity across the utilization circuits wherein they are polarity sensitive is always maintained.

It will of course be apparent to those skilled in the art that, as a general rule, when embodiments of the present invention are used in an environment in which one expects to encounter reverse battery supervision on the subscriber loop, that the embodiment of the connecting arrangement shown in FIG. 2 should be used in lieu of that of FIG. 4 since reverse battery supervision of the circuit of FIG. 4 would result in diode 34 becoming forward biased and shunting the line during the presence of the reverse battery condition.

Furthermore, it should be noted that in the foregoing descriptions of operations of the circuits of FIGS. 2–4, a current flowing through telephone 12. If the foregoing examples are modified to include the assumption that telephone 12 is on-hook and thus represents an open circuit to DC components present on subscriber line 12, it will be appreciated that no current will flow through utilization device U1 since it is in series with telephone 12. However, inspection of the circuits will reveal that utilization device U2 remains across the conductors of the subscriber line. In all examples, U2 will remain connected in its proper polarity shunting the conductors of subscriber line 11 as connected through the forward biased diodes. Thus it may be seen that utilization device U2 may appropriately be embodied as a hold circuit which can shunt subscriber line 11 and place a sufficient load on the central office so as not to cause the central office to disconnect the preferred embodiment even when telephone 12 is on-hook and represents an open circuit.

Figure 5:
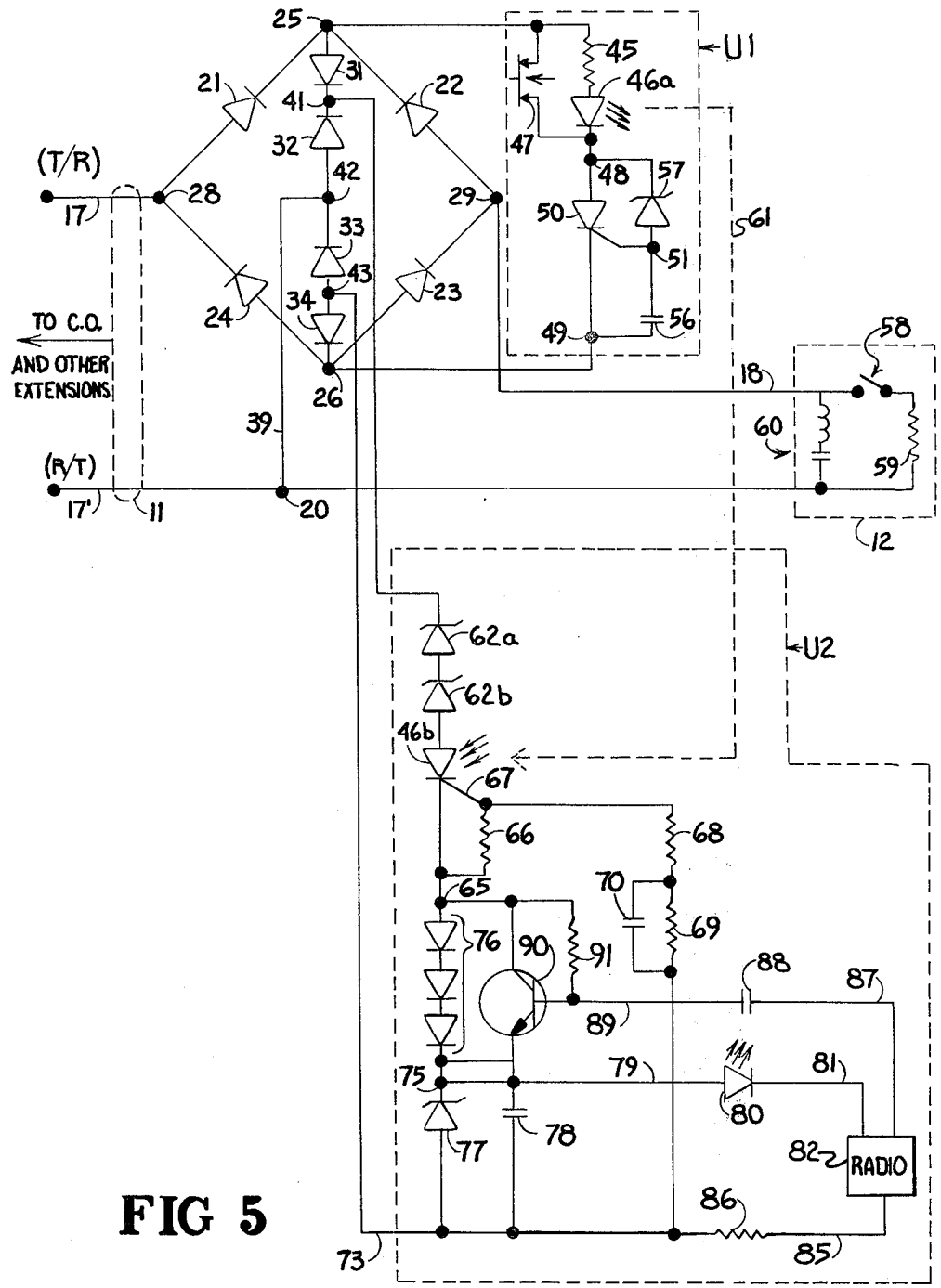
FIG. 5 is a schematic diagram of the preferred embodiment of the present invention.

Turning next to FIG. 5, a schematic diagram of the preferred embodiment of the entire present invention including the diode arrangement and the utilization circuit is shown. In reference to FIG. 1 it should be noted that it is contemplated that embodiments of the present invention will be used on a plurality of extension phones all connected to one subscriber line. While only one combination of the utilization devices and phone 12 is shown in FIG. 1, it should be understood that an embodiment of the present invention could also be connected across the subscriber line tap connecting phone 12'. Indeed, the use of privacy circuits usually contemplates that each telephone extension in a multi-extension single line arrangement will be equipped with a privacy circuit.

In FIG. 5, the diode connection arrangement is as shown in FIG. 2. Utilization device U1 is shown enclosed by a dash line which is so labeled. Similarly, a dash encloses the preferred embodiment of utilization device U2.

The first utilization circuit U1 is the circuit providing the privacy features of the preferred embodiment. Proceeding from point 25, two elements which couple the first utilization to the second utilization circuit are shown. A series combination of resistor 45 and the light-emitting diode portion 46a of an SCR optocoupler, the SCR of which is shown as 46b and utilization circuit U2, is first encountered. This series combination is shunted by a normally closed momentary switch 47. Unless the button which operates switch 47 to open its contacts is activated, point 25 will be electrically identical to point 48. It should be understood that the button operating switch 47 will be manifested as a push button available to the user either on the telephone, or on a separate enclosure housing the preferred embodiment. The elements of simplified privacy circuit of the present invention appear between points 48 and 49. Point 49 is electrically identical to point 26. The preferred embodiment of the privacy circuit includes a silicon controlled rectifier (SCR) 50, the gate terminal of which is connected to point 51. Interposed between points 48 and 51 is zener diode 57. In the preferred embodiment, zener diode 57 is characterized by a zener breakdown voltage of approximately 22 volts. Between points 51 and 49 is the series RC combination of resistor 55 and capacitor 56. This combination serves to protect the gate to cathode junction of SCR 50 when zener diode 57 breaks down.

Keeping in mind that utilization circuits U1 is connected in series with one conductor from subscriber loop 11 and telephone 12, it will be appreciated that it operates as follows. First note that on FIG. 5, telephone 12 has been represented by a hook switch 58 and impedance 59 normally on the order of approximately 500 ohm and a series LC combination representing the ringer of the telephone.

The structure of the preferred embodiment of the second utilization circuits U2 is also shown on FIG. 5. The optical link between LED 46a and light sensitive SCR 46b is represented by dashed line 61.

Note that utilization circuits U2 extends between its positive input terminal connected to point 41 and its negative terminal connected to point 34. Connected to point 41 is a pair of zener diodes labeled 62A and 62B, each of which has a nine volt zener voltage. The anode of SCR 46b is connected to anode of zener diode 62B and the cathode of the SCR is connected to point 65. A gate to cathode resistor 66 is also provided. Note that line 73 is electrically connected to point 43. Extending between the gate terminal 67 of SCR 46b and line 73 is a pair of resistors 68 and 69, the latter of which is shunted by capacitor 70.

Following the series circuit from point 41 to line 73, a series of three diodes 76 are interposed between points 65 and 75. It should be understood that embodiments of the present invention may be constructed using any number of N diodes where N is an integer greater than zero. However, the preferred form is to use N equal to 3 which has been found to meet technical requirements of Part 68 of the FCC Regulations as they exist at the time of writing this specification. Between point 75 and line 73 is the parallel combination of zener diode 77 and capacitor 78. Connected to point 75 is line 79, light emitting diode 80, and line 81. Line 81 leads to the positive power supply input of a radio 82. The negative power supply input of radio 82 is connected to line 85 which is returned through resistor 86 to line 73. The audio output from radio 82 appears on line 87 and is coupled by capacitor 88 to line 89 which forms the base input of transistor 90. A biasing resistor 91 extends between the collector of transistor 90 at point 65 and the base on line 89.

OPERATION OF THE PRIVACY CIRCUIT

Keeping in mind that privacy circuit U1 extending between points 25 and points 26 is in series with telephone set 12, consider the application of a ringing voltage between the conductors of subscriber line 11. Zener diode 51 is selected, in the preferred embodiment, to have a breakdown voltage of approximately 22 volts. Ringing current will pass from point 25 through switch 47 to point 48 and, through zener diode 57 when it breaks down to point 51. Current will also pass from point 51 to point 49 through both the series combination of resistor 55 and capacitor 56 and through the gate terminal of SCR 50. From point 49, the current proceeds to point 26, through diode 23, to point 29, onto line 18 through ringing circuit 60 back to conductor 17'. The ringing voltage is sufficient to assure that zener diode 57 is conducting during application of the ringing voltage. Also, during the inter-ring periods of the ringing signal, the open circuit voltage between tip and ring conductors of subscriber line 11 will be sufficient to assure that zener 57 is broken down when the telephone goes off-hook closing switch 58.

Thus, lifting the telephone receiver from the cradle (not shown) closes switch 58. Zener diode 57 is broken down assuring a large supply of current to the gate of SCR 50 thus causing the SCR to fire. When switch 58 closes, loop current begins to flow through telephone 12 and the impedance thereof is represented at 59. As is known to those skilled in the art, the voltage across the subscriber loop will drop to a value in the range of about 5 to 18 volts when the telephone is off-hook. While SCR 50 will remain in its conducting state, it will readily be appreciated that if the call has been answered by another extension, closure of switch 58 on telephone 12 will not fire SCR 50. This is because the voltage between conductors 17 and 17' is lower than the breakdown voltage of zener diode 57 and effectively no current is supplied to the gate of SCR 50.

Thus, the first extension connected to subscriber line 11 to answer a call will prevent all other extensions equipped with privacy circuit U1 from interrupting the call by the closure of hook switch 58. This is true irrespective of whether the extension answering the call is so equipped. Thus, if the user desired, one telephone not equipped with the circuitry of the present invention could have the ability to both answer and interrupt any call. While other extensions equipped with the present invention will be precluded from interrupting a call when any other extension has seized the line.

Once the user of phone 12 is connected to a call by the closure of hook switch 58 and SCR 50 is conducting, the call may be placed on hold by the operation of switch 47. Operation of switch 47 opens the short circuit which has shunted resistor 45 and LED 46a and causes current to flow through these components causing the LED to emit light. As is indicated by dashed line 61, the LED is optically coupled to SCR 46b. When switch 47 opens, resistor 45 is inserted in series with the telephone set. In the preferred embodiment, resistance 45 is on the order of 2 kilohms and it will be readily appreciated that this causes the voltage between points 25 and 20 to be raised to a value exceeding the voltage across hold circuit U2 during a hold condition. This causes SCR 46b to fire and current will begin flowing through holding circuit U2. When the telephone is placed back on hook, opening switch 58, momentary switch 47 may be released extinguishing LED 46a. However the hold circuit will continue to operate as described below until switch 58, or the hook switch on another extension is again closed.

Consider for a moment the other effects of operation of switch 47. As is explained below, the voltage across the hold circuit during a hold condition is on the order of 32 volts and the breakdown voltage of zener diode 57 is on the order of 22 volts. The opening of switch 47 drives the gate of SCR 46b in the hold circuit, causing same to begin conducting and conditioning the voltage between the tip and ring conductors to break down the zener diode 57 associated with any privacy circuit connected to the line. Thus, under these conditions, any other telephone set (equipped with the present device) which goes off-hook while switch 47 is opened, will encounter a voltage condition across the line sufficient to cause its privacy circuit to fire.

Thus, it will be appreciated that switch 47 serves a dual function in the preferred embodiment shown in FIG. 5. It may be operated by the operator of the phone set initially seizing the line simply to activate the hold circuit and place the line in a held condition when the user places his telephone set back on-hook.

Also, the use of LED 46a as a triggering means for triggering SCR 46b in the holding circuit, combined with the use of resistor 45 as a means for elevating the voltage across tip and ring when momentary shunting switch 47 is open, causes operation of switch 47 to condition other telephone sets equipped with the present invention to become connected to the call. Thus, if the user wishes to get another party on another extension connected to the line, the user may simply depress the hold button and indicate to the party on the other extension that they should pick up. Since the hold button remains depressed and resistance 45 is in series with the telephone currently off-hook, the tip to ring voltage across the subscriber line will be sufficient to fire the privacy circuit of the other extension. When the other extension goes off-hook, the voltage across the line will drop since it is assumed that the party at the second extension has not depressed his hold button; and thus there is no resistor 45 at the second extension connected to the line.

When the second telephone goes off-hook, the voltage across the line drops below the combined zener voltages of diodes 62 and 77 in the hold circuit and thus SCR 46b becomes current starved and cuts off even though it is receiving gate drive through the above-noted optical coupling. Thus, it will be appreciated that the arrangement of the present invention provides the use of one momentary contact pair embodied by switch 47 which may be used to both place the hold circuit in a hold condition as well as condition the telephone line for defeat of the privacy device on other extensions and to allow multiple parties to become connected to the call.

It should further be noted that two indicator signals are shown in the preferred embodiment which allow the party initially operating hold switch 47 to determine if another party has picked up. The presence of music-on-hold in the preferred embodiment provides an audio indication signal and light emitting diode 80 in the hold circuit provides a visual indication.

Thus, in operation of the preferred embodiment, the party on the extension initially controlling the call will hear music and see the LED on his telephone set illuminated when the hold button is depressed. When the above-described party at the second extension goes off-hook, the hold circuit is cut off, thus terminating both visual signal from LED 80 and the music provided by the hold circuit. This allows the user to immediately ascertain that another extension has been lifted off-hook. This is useful both in the case of a desired seizing of the line by a second extension and an unauthorized pickup while the hold button is depressed. Thus, it will be appreciated that if the party hangs up while trying to simply place the call on hold, and another extension manages to seize the line and still effect the hold condition by maintaining the button at the second extension in a depressed condition, the original party would still be able to detect that his or her extension no longer controls the call by the absence of illumination of LED 80.

OPERATION OF THE HOLD CIRCUIT

The preferred embodiment of the hold circuit, which is utilization circuit 2, is shown in FIG. 5. Keeping in mind that light activated SCR 46b will have been fired when hook switch 58 opens, it will be seen that current will begin flowing between points 41 and 43. As is known by those skilled in the art, the hold circuit must maintain a voltage across subscriber line 11 which is low enough to prevent the central office form interpreting the line condition as a hang up. It is known in the art to use both thyristor elements and circuits constructed around electromechanical relays to implement hold functions. It is a known practice, which is practiced by the present invention, to make the voltage across the loop conductors when the hold circuit is active greater than the voltage between the conductors when a telephone set is off-hook, and to make the hold circuit sensitive to a subsequent drop in tip to ring voltage (evidencing a telephone extension going off-hook) to terminate the hold condition.

In the combination of the preferred embodiment, it is further necessary to keep the voltage between points 41 and 42 above the firing voltage of privacy circuit U1 in order to assure that the voltage is sufficiently greater than the zener voltage of diode 57. Otherwise, once the line was placed in a hold condition, the closure of a hook switch would not fire privacy circuit and no extension (assuming all were equipped with the preferred embodiment) could seize the line. Thus the hold condition could not be terminated creating a highly undesirable set of circumstances.

In the preferred embodiment disclosed herein, the total voltage across the hold circuit U2 varies between 34 volts and 32 volts on loops characterized by total loop resistance (including impedance 59 of the telephone set) of approximately 475 ohms to approximately 2.3K ohms. Since the preferred value of the zener voltage of diode 57 is 22 volts, it can be seen that the above-described condition is met. Also, under the worse case described above (highest total loop resistance), approximately 12 milliamps of loop current is maintained in the hold condition which is sufficient to prevent the central office from interpreting the line condition as being on-hook and thus dropping the call.

The total voltage drop between points 41 and 42 is determined by the zener voltages of diodes 62a, 62b, and 77, plus the forward voltage drops across SCR 46b and diodes 76. It will be apparent that diodes 62 may be placed on the other side of diodes 77 in series with line 73 without effecting operation of the circuit. The preferred embodiment of the present invention includes a line powered music on hold feature provided by radio 82. In the preferred embodiment, diode 77 is characterized by a zener voltage of 10 volts which is shunted by capacitor 78.

The combination of capacitor 78 and resistance 86 shown in the preferred embodiment, serves a filtering function. It was found by the inventor of the present invention that certain radios, including the radio disclosed as the preferred component to embody radio 82, used Class B push/pull audio output stages. Since these radios tend to be of an inexpensive variety and are designed for battery powered operation, there is very little regulation in the power supply circuit of such radios. Thus, as will be known to those skilled in the art, an audio component feeds back through the power supply terminals from the switching of the transistors in the push/pull output stage. This was causing an unwanted and distorted injection of signal into the telephone line. The combination of capacitor 78 and resistor 86 filters out this unwanted audio signal.

When the circuit is in a hold condition, current flows through lines 79 and 81 into radio 82 providing power to the radio. Also, LED 80 is made visible to the user to provide a visible indication that the circuit is in a hold condition. In the preferred embodiment, a model ST-311A AM-FM radio manufactured by Stuart Company is used and with a minor alteration to the output circuitry, cutting a connecting between a capacitor (C22 as designated by the manufacturer) and the potentiometer controlling the volume output, and inserting a resistance on the order of 50-60 kilohms in series with the volume potentiometer, rejoining said capacitor and the additional resistance, and adding a second additional resistance of 10-30 kilohms in series therewith, sufficiently modifies the audio output of this particular radio for connection to line 87. There are many types of radios which may be used to construct embodiments of the present invention and minor modifications to the audio output stages will be readily apparent to those skilled in the art.

The audio output appears on line 87 and is coupled through capacitor 88 to line 89 at the base of transistor 90. Transistor 90 is self biased by resistor 91.

It has been discovered by the inventor of the present invention that the circuit arrangement shown including transistor 90 and diodes 76 provide an inexpensive very practical self limiting output stage for injecting a signal into the telephone line without the use of complicated automatic gain control circuitry. It is has further been discovered that use of the arrangement shown renders the level of the injected signal vertually insensitive to total loop resistance. As noted above, transistor 90 is biased by resistor 91. While this type of self biasing arrangement is known to have the drawback of a lack of thermal stability, and to be sensitive in the changes in the value of beta for the transistor, it does have the advantage of inherently providing negative feedback in response to increases in voltage between points 65 and 75.

As signal swings occur on line 89, the total current flow between point 65 and 75 is alternately switched between transistor 90 and diodes 76. In response to a large positive signal on line 89, transistor 90 approaches saturation and diodes 76 will begin to cut off. As large negative excursions occur on line 89, transistor 90 is driven toward cutoff as the emitter to collector voltage increases. However, as the emitter to collector voltage approaches approximately 2.1 volt, diodes 76 begin to fully conduct. It should also be noted that, in the transition from cutoff to full conditions, diodes 76 will be operating in the familiar exponential "knee" region of their V/I characteristics. Thus, the series connection of diode 76 shunting the collector to emitter leads of transistor 90 provides a very simple and sensitive nonlinear resistance on the output of this amplifier stage. While this arrangement inherently causes some distortions due to nonlinearities, the sound quality has been found to be quite adequate for providing pleasant music to the party on hold during the hold interval. Furthermore, most of the harmonics generated by the nonlinearities resultant from diode 76 switching on are outside the bandwidth of a normal voice grade telephone line.

It has been found that construction of the preferred embodiment using the component values shown in the table below, provides a maximum signal level for the music-on-hold of minus 9 dBm. In the table, resistances are in ohms and capacitance is in microfarads.

As described hereinabove, diode 76 can be embodied by any number of N diodes where N is an integer greater than zero. The selection of N as a greater or lesser number than the three shown in the preferred embodiment will have the effect of increasing or decreasing, respectively, the maximum signal level which the music on hold circuit can inject into the telephone line.

TABLE

| Reference Numeral | Device Type or Value |
|---|---|
| 45 | 2.2K |
| 46 | MOC 3001 (Motorola) |
| 50 | C203B |
| 55 | 1K |
| 56 | 10 |
| 57 | 22 v, .25 watt |
| 62a, 62b | 9 v., 1 watt |
| 66 | 10K |
| 68 | 380 |
| 69 | 100K |
| 70 | .1 |
| 21-24; 31-34, 76 | 1N 4004 |

TABLE-continued

| Reference Numeral | Device Type or Value |
| --- | --- |
| 77 | 10 v., 1 w. |
| 78 | 220 |
| 86 | 100 |
| 88 | .01 |
| 90 | MPS-A12 (Motorola) |
| 91 | 82K |
| 91 | 75K |
| 88 | .1 |
| 92 | .1 |
| 95 | 500 |
| 96 | 100K |
| 99 | .01 |
| 110 | 2Z414 |

It should further be apparent that when the preferred embodiment of the present invention is used on low resistance loops, the sharp nonlinearity in the V/I characteristics of diodes 76 render the limiting provided by the circuit arrangement virtually insensitive to loop resistance. Thus the signal injection scheme for the music-on-hold circuit of the present invention provides a very simple and inexpensive limiting output stage that is virtually insensitive to loop resistance, sharply and dependably limits the level of the signal injected onto the line in a manner which complies with the requirements of the Federal Communications Commission, and is thus a considerable improvement over prior art transformer and RC coupled music-on-hold circuits. Furthermore, while the volume control associated with radio 82 may be adjusted to a point where clipping occurs, the signal level will not exceed that determined by diodes 76. All of this limiting is accomplished without the use of AGC circuits normally associated with prior art music-on-hold functions.

As is known to those skilled in the art, hold circuits should be constructed so that the hold condition will not be terminated in response to momentary interruptions of loop current to which calls in progress are periodically subjected to by central offices throughout the United States. The termination of loop current for an amount exceeding a predetermined time should properly be interpreted as a disconnect, and terminate the hold condition. However, it is desirable to assure that the hold circuit does not cut off prematurely under these conditions.

As set forth in the background of the invention, prior art arrangements have required storage of either large amounts of charge to hold the device defining the hold function (usually a relay or a thyristor) in a particular state during momentary current interruptions. Other prior art arrangements have required additional switching components such as transistors operated by capacitors of smaller value to connect the anode circuit of a thyristor to the gate circuit to provide gate current for retriggering when momentary interruptions occur.

One of the novel aspects of the present invention is that the gate of SCR 46b is properly conditioned so that the SCR will refire when current is reestablished within a predetermined time after momentary interruption without using the additional components or capacitors of a large value required by prior art systems. The simplest form of this part of the invention is discussed in connection with FIG. 8 but its operation in the circuit of the preferred embodiment will now be described.

In the preferred embodiment, a parallel RC circuit consisting of resistor 69 and capacitor 70 is provided between gate terminal 67 of SCR 46b and line 73 which may be conveniently thought of as a "local ground".

Analyzing a loop beginning on line 73, going through the above noted parallel RC circuit, through resistor 68, the parallel combination of the gate to cathode circuit of SCR 46b and resistor 66, continuing through diodes 76 and zener diode 77 leads to the following conclusions. When the hold condition has been established, the voltage across capacitor 70 is approximately equal to the total voltage across zener diode 77 and the forward drops associated with diodes 76. Thus, the voltage across capacitor 70 considerably exceeds the normal gate to cathode voltage present if the other side (from the gate) of the parallel RC were tied to the cathode of SCR 46b. Since the charge stored on capacitor 70 is proportional to the voltage across it, this arrangement has the effect of multiplying the effective value of capacitor 70 as a charge storing device for providing gate current after cut off by a ratio of the total voltage on capacitor 70 to the normal gate to cathode voltage during conduction.

Consider for a moment the momentary interruption of loop current. Radio 82 represents a significant load across the parallel combination of zener 77 and capacitor 78. Shortly after the momentary interruption of loop current, the voltage between point 75 and line 73 will drop below the value of the zener voltage of diode 77 due to the relatively rapid discharge of capacitor 78 into the power supply terminal from line 81 of radio 82. Thus, zener diode 77 effectively becomes an open circuit. However, radio 82 still represents a load between point 75 and line 73. Thus, a complete current path is available in a loop consisting of the following elements. Beginning at line 73, through RC combination 69, 70, continuing through the gate circuit and diode 76, back to point 75, along line 79, through diode 80 and radio 82 through line 85 and resistor 86 back to line 73. Therefore it will be appreciated that even though the loop current is terminated, a complete path for the discharge of capacitor 70 which will be providing current to the gate terminal 67 during the entire discharge cycle of the capacitor.

Thus, the voltage across capacitor 70 is maintained at a relatively high level, decreasing the necessary value of the capacitor to maintain a current flow into gate 67 during momentary interruptions of loop current and at the same time provides a complete loop for the discharge of capacitor 70 without the necessity of providing additional switching components to connect the anode circuit of SCR 46b to the gate during such interruptions. Thus, the present invention provides a scheme for assuring retriggering within a predetermined time after commencement of a momentary interruption of loop current without adding additional loading to the loop and which does not require switching circuits to connect the gate to the thyristor anode circuit as was done in the prior art. The prior art switching arrangement required use of part of the reestablished loop current to provide firing current to the thyristor gate.

Figure 6:
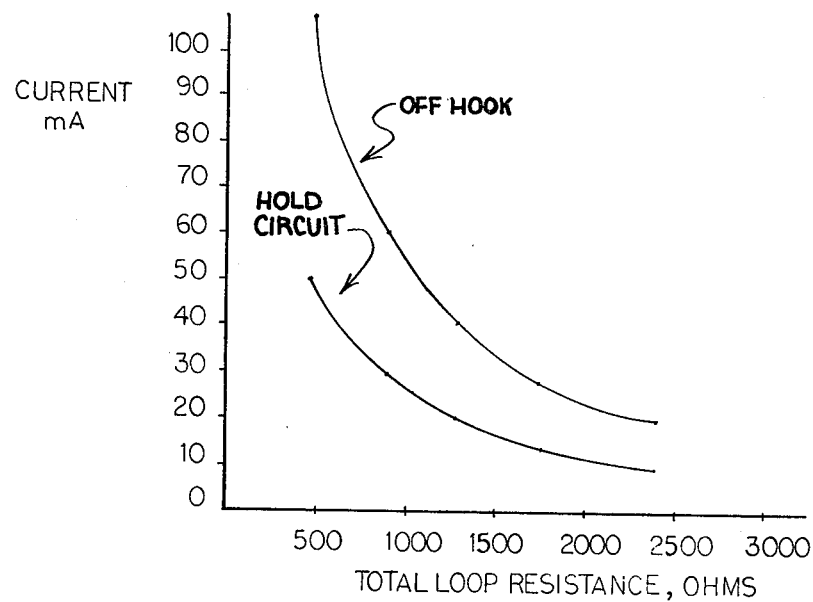
FIG. 6 is a graph of currents drawn in the preferred embodiment of the present invention under a variety of loop conditions.

In FIG. 6, the total off-hook current and the current drawn by the hold circuit when it is active, for conditions of varying total loop resistances, is shown. It may be seen from this graph that the hold circuit of the preferred embodiment draws sufficient loop current over a wide range of total loop resistances to prevent the central office from interpreting the hold condition as a hang-up condition. Also, keep in mind that the above described limiting stage, including transistor 90 and diodes 76, is effective throughout this range to keep a constant signal level from the music-on-hold feature present on the line.

Figure 7:
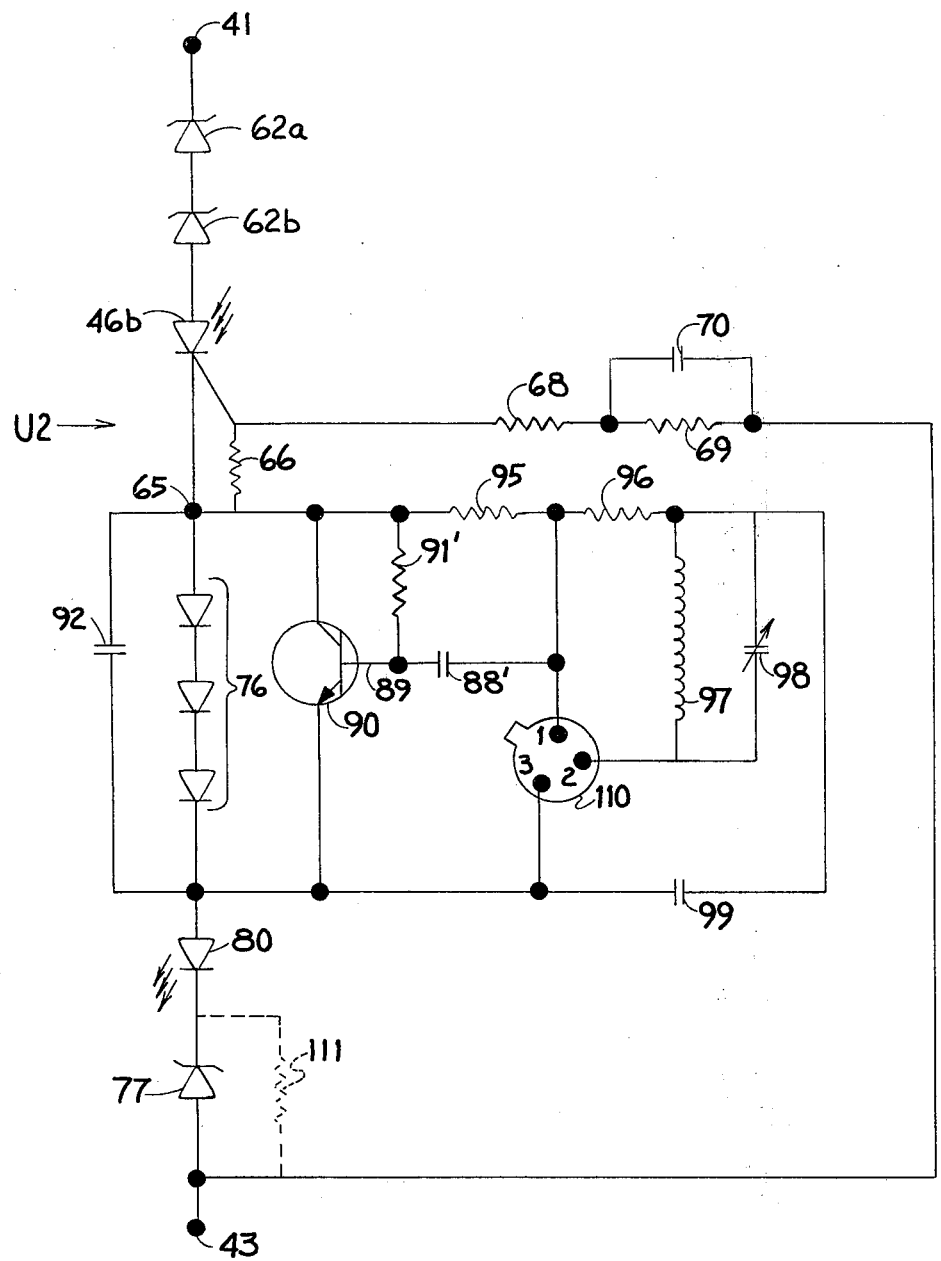
FIG. 7 is an alternate embodiment of the second utilization circuit of the present invention.

In FIG. 7, an alternate embodiment of the hold circuit, utilization circuit U2 is shown.

In this arrangement, an integrated circuit radio receiver designated as 2Z414 is used. Inductance 97, variable capacitance 98 together with resistance 96, forms a tuning circuit between pin 1 and pin 2 of the device. Furthermore, the device 110 is designed to have power supply thereto connected between pins 1 and 3. Note that the same self limiting output stage comprising transistor 90 and diodes 76 is used to couple the audio output on line 89′ to the telephone subscriber line.

Capacitor 92 acts as a power supply filter capacitor between pins 1 and 3 of the integrated circuit radio. Also in this embodiment, the forward drop across diodes 76 defines the power supply voltage supply to the IC. Thus, in this embodiment, diodes 76 serve both as a voltage reference for the power supply to an integrated circuit radio and as the variable resistance shunting the collector to emitter of transistor 90 to limit the level of the injected signal.

While the circuit will operate as shown in FIG. 7, an additional resistance shown in phantom as 111 is necessary for the circuit to provide the discharge path for capacitor 70 as described above in connection with FIG. 5 to assure refiring of the SCR after momentary interruptions of loop current.

Figure 8:
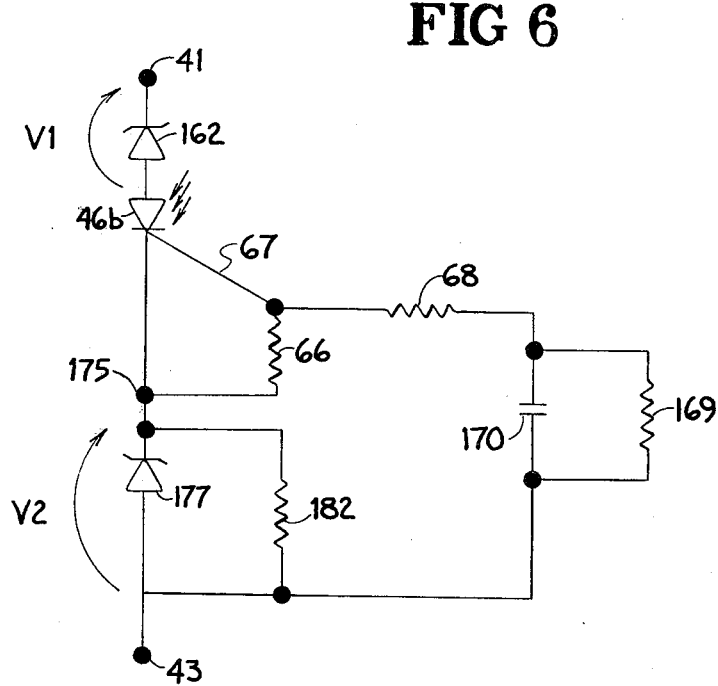
FIG. 8 is an alternate embodiment of a hold circuit according to the present invention.

Turning next to FIG. 8, a simpler form of the improved retrigger circuit for the hold circuit of the present invention is shown. Such an arrangement does not feature a music-on-hold function. However, it will be appreciated that resistance 182 can correspond to the load of radio 82 shown in FIG. 5. It will be appreciated that the total drop between points 41 and 43 needed during an active hold condition is the sum of the voltage drops across zener diodes 162 and 177 plus the forward anode to cathode drop across SCR 46b. FIG. 8 demonstrates the fact that, within certain limits described hereinbelow, the value of the zener voltage of diode 177 (which of course may be embodied by a pluralty of zener diodes in series) may be made as large as is desired in order to increase the voltage across, and thus decrease the value of, capacitor 170. It will further be apparent that embodiments of this circuit could be constructed which elminated resistor 169 and zener diode 177. However, using only resistance 182 as the element which raises the voltage across capacitor 170 would make the total time period of a momentary interruption, afterwhich retriggering will not occur, a function of total loop resistance.

In the circuit of FIG. 8, it should be appreciated that cutoff of SCR 46b due to a momentary interruption will cause zener diode 177 to turn off since the voltage Vz between points 43 and 175 drops below the zener voltage. However, resistance 182 provides a current path between these points. Thus, as capacitor 170 begins to discharge, a loop is completed from capacitor 170, resistance 68, the parallel combination of resistor 66 and the gate to cathode junction of SCR 46b, through resistor 182 back to the other side of the capacitor.

Assuming that it is desired to make Vz as large as practically possible, it will be appreciated that the value of V1 across zener diode 162 is small. This leads to a lower limit on the value for resistance 182. If we define Voh as the voltage between points 41 and 43 when a telephone set is off-hook, it will become apparent that resistance 182 could be made small enough so that the current through the SCR will never drop below the holding current. Thus, Ih is defined as the minimum holding current which assures that SCRs of the type used to embody 46b will cut off. Thus it will be apparent that the value of resistance 182 must be greater than (Voh-V1)/Ih. Of course, V1 can be made equal to 0 so that the totality of the voltage, when the hold circuit is in an active condition, is dropped across zener 177. This follows from the use of a light sensitive SCR and requires no connection whatsoever from the anode circuit of the SCR to the gate circuit.

While the foregoing has been a description of the preferred embodiment and the best mode of practicing the present invention together with some alternate simplified embodiments, it should be appreciated that the scope of the present invention is defined by the claims below.

I claim:

1. In a telephone hold circuit of the type including a thyristor, said thyristor including a first main terminal and a second main terminal connected to shunt a telephone subscriber line with said first main terminal connected to a negative lead of said telephone subscriber line and a gate terminal and a characteristic gate to first main terminal junction;

said circuit including means for selectively triggering said thyristor from an off state to a conducting state by selective application of a triggering signal to said gate terminal; and voltage dropping means connected in series with said main terminals for maintaining a voltage drop across said telephone subscriber line when said thyristor is in said conducting state; the improvement comprising in combination;

means connecting said voltage dropping means in series between said first main terminal at a first connection point and a local ground at a second connection point, said local ground being further connected to said negative conductor of said telephone line;

means connecting a capacitor in series with said local ground and said gate terminal; and load means connected between said first connecting point and said second connecting point, thereby providing a discharge path for charge from said capacitor through said gate to first main terminal junction, said load means, back to said local ground.

2. The improvement of claim 1 wherein said thyristor is a silicon controlled rectifier and said first main terminal is a cathode terminal of said silicon controlled rectifier.

3. The improvement of claim 1 wherein said thyristor is a light activated silicon controlled rectifier.

4. In a single line telephone hold circuit of the type adapted to be used with a telephone set connected to said line, said line and said telephone set providing a characteristic off-hook voltage across said line, said telephone hold circuit being of the type including a selectively triggerable thyristor shunting said line and a voltage controlling means in series with said thyristor for providing a predetermined holding voltage greater than said characteristic off-hook voltage across said line when said hold circuit is in an active condition, the improvement comprising in combination:

a privacy circuit connected in series with said telephone set including breakdown means responsive to a predetermined firing voltage across said line to operably connect said telephone set to said line;

said holding voltage being greater than said firing voltage and said firing voltage being greater than said characteristic off-hook voltage;

voltage dropping and firing means connected in series with said privacy circuit and said telephone set in an arrangement by which said hold circuit shunts the series combination of said telephone set, said privacy circuit, and said voltage dropping and firing means for raising the voltage across said line above said holding voltage when said telephone set is off-hook and for firing said thyristor in response to current flow through said voltage dropping and firing means; and switch means including at least one normally closed contact pair shunting said voltage dropping and firing means and being selectively operable to open said contact pair to provide said current through said voltage raising and firing means.

5. The improvement of claim 4 wherein said voltage raising and firing means includes a light emitting device, said thyristor is a light activated SCR and said light emitting device and said light activated SCR are optically coupled.

* * * * *